United States Patent [19]

Luetzelschwab

[11] Patent Number: 4,553,594
[45] Date of Patent: Nov. 19, 1985

[54] FLOW CONTROL METHOD

[75] Inventor: Wayne E. Luetzelschwab, Littleton, Colo.

[73] Assignee: Marathon Oil Company, Findlay, Ohio

[21] Appl. No.: 483,149

[22] Filed: Apr. 8, 1983

Related U.S. Application Data

[62] Division of Ser. No. 361,622, Mar. 25, 1982, Pat. No. 4,510,993.

[51] Int. Cl.$^4$ .............................................. E21B 43/22
[52] U.S. Cl. ................................ 166/275; 166/305.1; 252/8.55 D
[58] Field of Search ............... 252/8.55 D, 8.55 R; 166/275, 274, 305 R, 252, 273, 75 R, 268

[56]  References Cited

U.S. PATENT DOCUMENTS

| | | | |
|---|---|---|---|
| 2,601,654 | 6/1952 | Wright | 137/515 |
| 2,725,212 | 11/1955 | Jensen | 251/122 |
| 2,807,279 | 9/1957 | Presnell | 137/504 |
| 3,436,346 | 4/1969 | Westover et al. | 252/8.55 D |
| 3,743,018 | 7/1973 | Norton et al. | 252/8.55 D |
| 3,815,679 | 6/1974 | Blanke et al. | 166/275 |
| 3,853,802 | 12/1974 | Norton et al. | 260/29.6 WB |
| 3,938,594 | 2/1976 | Rhudy et al. | 252/8.55 R |
| 4,016,086 | 4/1977 | Norton et al. | 252/8.55 D |
| 4,204,574 | 5/1980 | Stalder | 166/305 R |
| 4,234,433 | 11/1980 | Rhudy et al. | 252/8.55 D |
| 4,276,904 | 7/1981 | Jackson | 137/599 |
| 4,433,727 | 2/1984 | Argabright et al. | 252/8.55 D |

Primary Examiner—Stephen J. Lechert, Jr.
Assistant Examiner—Howard J. Locker
Attorney, Agent, or Firm—Jack L. Hummel

[57]  ABSTRACT

Apparatus, and method, for controlling the flow of dilute solutions of polymers such as dilute aqueous solutions of partially hydrolyzed polyacrylamides without causing any significant degradation of the polymer comprising the solutions. In one embodiment, the apparatus comprises a needle valve positioned in a conduit for transporting polymer solutions, and across which a fluid pressure differential exists. In another embodiment, the apparatus comprises a self-adjusting flow regulator which incorporates a tapered, or pointed, throttle carried on a reciprocatable piston.

5 Claims, 3 Drawing Figures

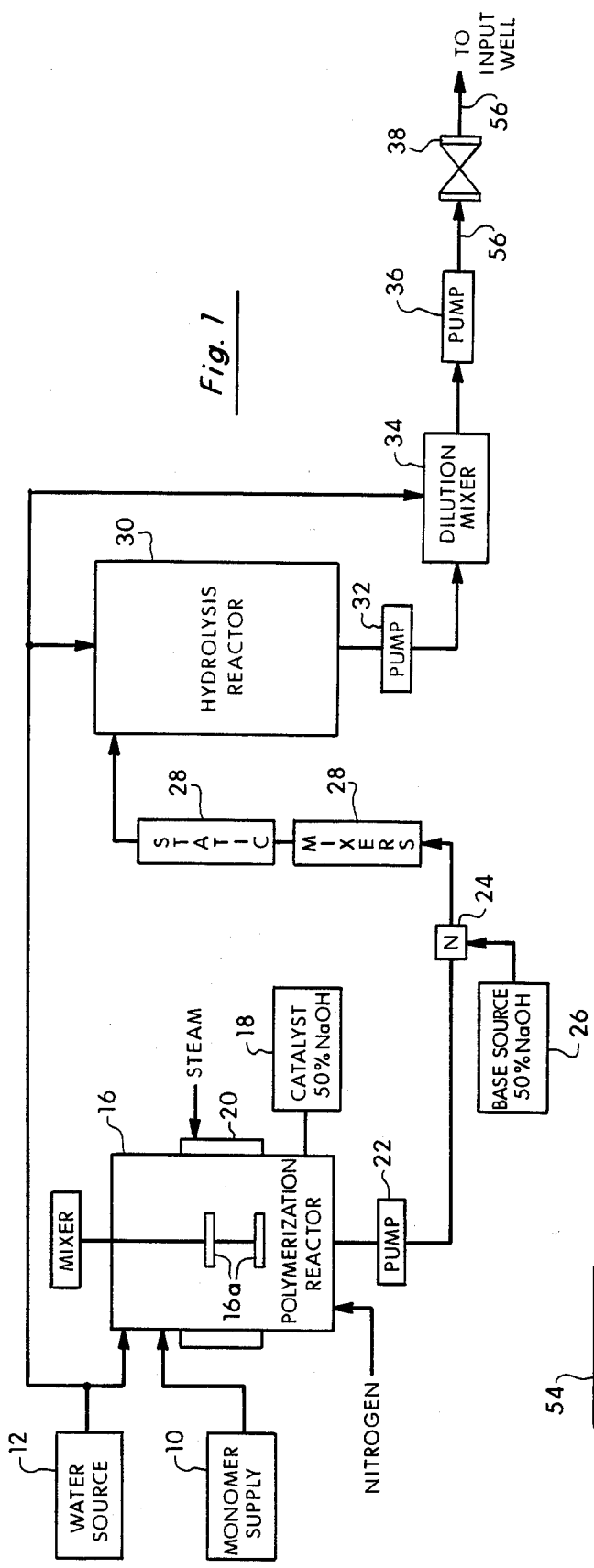
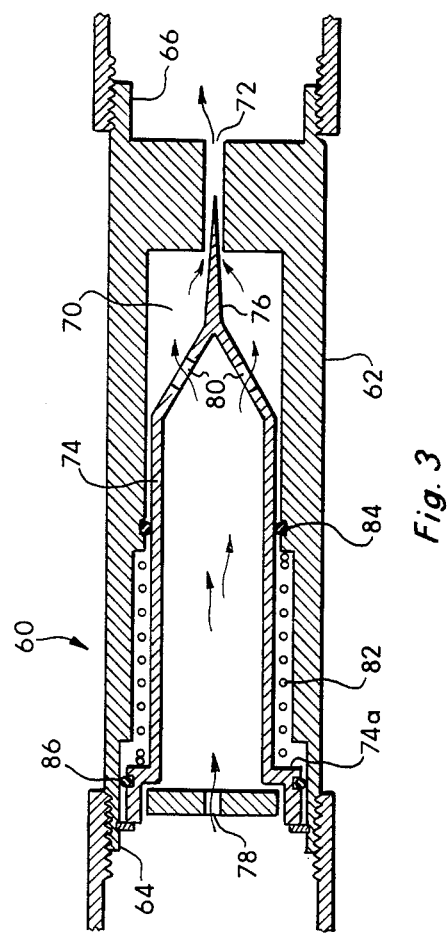
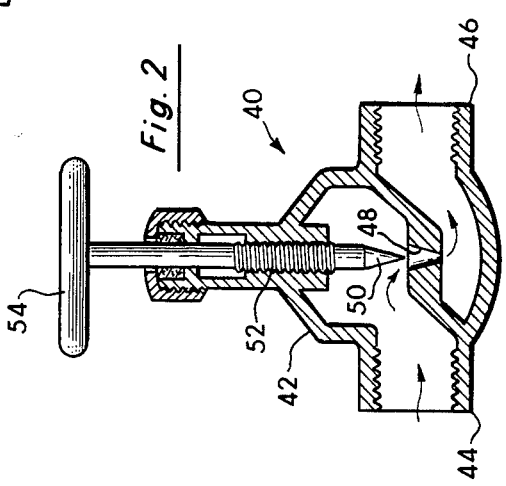

FLOW CONTROL METHOD

This is a division of application Ser. No. 361,622, filed Mar. 25, 1982, now U.S. Pat. No. 4,510,993.

TECHNICAL FIELD

The present invention relates to apparatus, and to a method, for controlling the flow of dilute polymer solutions across flow control means in a conduit to prevent degradation of the polymer comprising the solutions.

BACKGROUND OF PRIOR ART

Polymers such as partially hydrolyzed polyacrylamides are known to degrade to a substantial extent, even at low concentrations, when subjected to turbulences normally present in the equipment utilized to convey such polymers from one location to another. This problem is especially acute in situations where, as in the use of such polymer solutions in the recovery of oil from subterranean oil-bearing formations, the polymer solutions are transported through a series of conduits and flow control valves prior to injection into a wellbore. Degradation of the polymer adversely affects the injectivity and mobility properties of the polymer thereby greatly diminishing its ability to satisfy the performance demands of the oil-bearing formation. When large pressure drops of the order of 50 psig and greater are required in such operations, it is common practice to use long lengths of small diameter tubing or sand packs to reduce polymer degradation. In order to vary the pressure drop by this means, it is necessary to shorten, or lengthen, the small diameter tubing, or to vary the number of sand packs. This practice is cumbersome, at best, and does not provide the degree of control necessary to attain the desired result.

BRIEF SUMMARY OF THE INVENTION

Aqueous solutions of polyacrylamides, especially partially hydrolyzed acrylamides, have been widely used as drive fluids and/or mobility buffers in the secondary or tertiary recovery of oil from subterranean formations or reservoirs. The aqueous solutions are prepared by polymerizing an acrylamide monomer and then reacting the polymer with a monovalent base such as dilute sodium hydroxide to hydrolyze a predetermined mole percent of the amide groups comprising the polymer. The concentration of the partially hydrolyzed polymer in the aqueous solutions is of the order of 6%, and the solution has a gel-like consistency. The 6% solution desirably is first diluted with water to form a 1%, by weight, solution of the polymer, and then, prior to injection with an input well, is further diluted with water to provide an aqueous solution comprising anywhere from 50 to 5000 parts, more or less, per million of the polymer.

The apparatus, and method, of the present invention enable the transport of dilute solutions of polymers such as partially hydrolyzed polyacrylamides with substantially no degradation of the polymer taking place. As a result, the injectivity and mobility properties of the polymer solution remain essentially constant thereby imparting a high degree of predictability to the performance capabilities of the solution. This enables smaller volumes of the polymer solutions to be used, and contributes significantly to the efficiency of the oil recovery operation, factors which materially lower the normally high costs of such operations.

The apparatus of the present invention, in brief, comprises conduit means for transporting a polymer solution from one location to another, and flow control means positioned in the conduit means and across which a fluid pressure differential exists in the conduit means. The flow control means advantageously includes a tapered or pointed flow control element which is movable to a substantially fluid flow limiting position and to a fluid flow open position whereby the flow of a polymer solution through the conduit means and across the flow control means is selectively regulated. In one embodiment of the invention, the flow control means comprises a needle valve. It has been discovered that by positioning such a valve in conduit means for transporting an aqueous polymer solution, in particular, an aqueous solution of a partially hydrolyzed polyacrylamide, essentially no degradation of the polymer occurs even at appreciable fluid pressure differentials across the valve. This result is especially surprising and unexpected in view of comparative tests wherein a control valve of the globe type having an orifice size of 0.25 inch but a blunt disc secured to the valve stem, and a needle valve, having the same orifice size, but a pointed plunger or throttle, were each positioned in a conduit for transporting a dilute aqueous solution of a partially hydrolyzed polyacrylamide. Under the same flow conditions, degradation of the polymer across the globe type valve was observed to be of the order of 20% to 25%. In sharp contrast, no degradation of the polymer across the needle valve took place.

In another embodiment of the invention, a self-adjusting flow regulator provided with a reciprocatable piston and a tapered throttle or plunger is employed to maintain a constant pressure drop across the regulator in a surface or subsurface conduit for transporting polymer solutions while at the same time preventing polymer degradation.

The foregoing, and other features and advantages of the invention will become more apparent from the description to follow, taken in conjunction with the accompanying drawing.

BRIEF DESCRIPTION OF THE DRAWINGS

FIG. 1 is a schematic view of a representative system for preparing a partially hydrolyzed polyacrylamide in the field for injection into an input well of an oil-bearing formation showing a needle-type valve positioned in a conduit of the system;

FIG. 2 is a schematic sectional view of a typical needle-type valve for use in a system, such as the system illustrated in FIG. 1, for use in a conduit for transporting polymer solutions; and FIG. 3 is a schematic sectional view of a flow regulator which incorporates a needle-type plunger for use in a conduit for transporting polymer solutions.

DETAILED DESCRIPTION OF THE INVENTION

The system schematically illustrated in FIG. 1 comprises a monomer source 10 and a source of water 12 in communication with a polymerization reactor or vessel 16. A catalyst source 18 also is in communication with the vessel 16. The vessel 16 desirably has a stirrer or mixer 16a, and is provided with a steam jacket 20 for heating the reaction mixture in the vessel. The vessel 16 has provision for introducing nitrogen or other inert gas into the vessel 16 for removing, or substantially reducing the concentration of oxygen in the reaction mixture.

A pump 22, having its inlet end in communication with the vessel 16, and its outlet end in communication with a mixing nozzle 24 is provided for removing the formed polymer from the vessel 16 and into contact with an aqueous base solution from a source 26 thereof also in communication with the nozzle 24. The nozzle 24 is connected by a line to mixing means which, in the representative embodiment of the system illustrated, comprises static mixers 28. The static mixers 28, as shown, in turn, are in communication with a hydrolysis reactor or vessel 30 where dilution of the formed polymer occurs. A pump 32 is connected to the vessel 30 for removing the diluted polymer and transferring it to a final dilution mixer or unit 34. The diluted polymer solution formed in the unit 34, in turn, is moved by a displacement pump 36, through a flow control valve such as needle valve 38 from where it is injected into an input well. The aqueous polymer solution passing from the unit 34 and through the control valve 38 can contain from 50 to 5000 parts per million of polymer, usually from about 500 to about 2000 parts per million. In the field, aqueous polymer solutions of this concentration may be introduced into an input well as rates of from about 2 to about 100, generally from about 10 to 20 to about 30 gallons per minute. The total volume of polymer solution injected in a 24 hour period can range from about 100 to 250 barrels, more or less.

As indicated above, the use of flow control means which incorprates a needle valve, or a needle valve-like arrangement, in a conduit for transporting dilute aqueous solutions of a polymer such as those produced in a system of the type illustrated in FIG. 1, provides a polymer, at the injection well site, which has undergone essentially no degradation. What is equally surprising and unexpected, this result is attained at pressure drops across the flow control means in excess of 50 psig, in fact, upwards of 100 to 150 psig, or more, under the turbulent conditions normally encountered by fluids as they pass through flow control valves. It is also noteworthy that the flow control means employed in the practice of the present invention can be of a smaller size than would normally be required for controlling the flow of such polymer solutions.

In FIG. 2 of the drawings, a typical needle valve, designated generally by reference numeral 40, having utility for purposes of this invention is schematically illustrated. The valve, as shown, has a housing 42 formed with a threaded inlet end 44 and a threaded outlet end 46. A valve seat 48 is positioned between the ends 44 and 46, and is adapted to receive a tapered or pointed plunger 50 carried on a threaded valve stem 42. The stem 52 is secured to a handle 54 for controlling the flow of a fluid across the valve 40. The orifice size of the valve 40 is somewhat variable. However, the generally optimum objectives of the present invention are achieved with valves having an orifice size ranging from about 0.05 inch to about 2 inches, preferably from about 1 to about 1.5 inch in diameter. The internal diameter of the conduit, as represented by reference numberal 56 in FIG. 1, joined to the threaded ends 44 and 46 of the valve 40 also is somewhat variable. Typically, in the field, the conduit 56 will have an internal diameter in the range of from about 0.5 inch to about 3 inches, with about a 0.75 to about 2.5 inch internal diameter conduit being preferred. Exemplary of needle valves of the type schematically shown in FIG. 2 are the valves available commercially under the trade designations "Whitey Valve 7RF8" and "Whitey Valve 1RM6".

In order to demonstrate the unique and surprising results obtained with the needle valve arrangement of the present invention, an aqueous solution of a partially hydrolyzed polyacrylamide was transported across a "Whitey 1RM6" needle valve having a 0.25 inch orifice and a "Whitey 1VS8" faucet-type valve having a blunt plunger or disc, and orifice of the same size and body of the same design as the needle valve. Each valve was connected to one inch conduit. The flow rate of the polymer solution on the inlet side of the needle valve was about 8 gallons per minute at a pressure of about 286 psig. The viscosity of the solution was about 43.2 centipoises. The flow rate of the polymer solution on the inlet side of the valve equipped with a blunt disc or plunger was about 3 gallons per minute at a pressure of about 294 psig. The viscosity of the solution was about 69.4 centipoises. Each valve was appropriately restricted to give the same pressure drop. The pressure drop across the needle valve was about 286 psig. and the pressure drop across the blunt disc valve was about 294 psig. The viscosity of the polymer solution passing through the needle valve was unchanged. The viscosity of the polymer solution passing through the blunt disc valve, on the other hand, was 56.4 centipoises, a reduction in viscosity of 13.0 centipoises of the solution on the inlet side of the valve. The zero change in viscosity of the polymer solution which passed through the needle valve indicates that no degradation of the polymer in the solution took place despite the substantial pressure drop across the valve and the normal turbulence encountered by the solution in the valve. The approximate 20% drop in viscosity of the solution which passed through the blunt disc valve indicates appreciable degradation of the polymer took place as the solution passed through the valve. Similar results were obtained in comparative tests utilizing needle valves and globe type or blunt disc valves of various orifice sizes.

In FIG. 3 of the drawing, a self-adjusting flow regulator valve, designated generally by reference numeral 60, is schematically illustrated. A valve of this type is capable not only of self-adjustment to maintain a substantially constant pressure drop across the valve, but, more importantly, prevents degradation of the polymer as it passes through the valve. The valve 60, as shown, comprises a substantially cylindrical casing or housing 62 which is externally threaded at its inlet end 64 and its outlet end 66. The housing 62 is provided with an elongated axial bore 70 which is in communication with a narrow, axial, fluid passageway 72 at the outlet end 66 of the housing. The bore 70 is adapted to receive a hollow, cylindrical, reciprocatable piston 74 which is provided with a tapered, or pointed, needle valve-like plunger or throttle 76 at one end thereof, and a shortened, narrow, fluid inlet passageway 78 at the other end thereof. The walls of the piston 74 are tapered inwardly at their juncture with the plunger or throttle 76, and are provided with a plurality of spaced orifices 80-80 which are in communication with the axial bore 70 of the housing 62 adjacent the inlet end thereof. The bore 70 is counterbored to accommodate a compression spring 82 which acts to normally urge the piston 74 in the direction of the inlet end 64 of the housing 62. The piston 74 has an annular shoulder 74a against which the spring 82 rests. O-rings 84 and 86 provide a seal between the walls of the piston 74 and the bore 70.

The tapered, or pointed, plunger or throttle 76 of the piston 74 is normally urged by the spring 82 to a fully open position as illustrated in FIG. 3. Any increase in fluid pressure at The upstream or inlet end of the piston 74, that is, at the passageway 78, will act to urge the piston 74 and the throttle 76 downstream in the direction of the outlet end of the housing 62, against the bias of the spring 82, thereby restricting the flow of fluid through the passageway 72. Thus, the valve 60 functions to maintain an essentially constant pressure drop across the passageways of the valve. The valve 60 can be inserted in a conduit in much the same manner as the needle valve 40 described above.

The apparatus, and method, of the present invention provide a highly efficient, economical and practical means for controlling the flow of dilute polymer solutions, particularly, dilute aqueous solutions of partially hydrolyzed polyacrylamides, without any concomitant degradation of the polymer comprising the polymer, even at large pressure drops. While the apparatus and method have been described and illustrated with relation to specific embodiments of flow control valves and polymer solutions, it should be understood that such description and showing have been given by way of illustration and example, and not by way of limitation.

I claim:

1. A method for controlling the flow of polymer solutions of the type employed as drive fluids and/or mobility control agents in the recovery of oil from subterranean oil-bearing formations to prevent shear degradation of the polymer comprising the solution prior to introducing the polymer solution into an input well of the oil-bearing formation: including the steps of diluting the polymer solution to provide a concentration of the polymer in the solution sufficient to enable the solution to substantially meet the permeability requirements of an oil-bearing subterranean formation, transporting the diluted polymer solution through conduit means having flow control means positioned therein and across which a fluid pressure differential exists in the conduit means, said flow control means being in the form of a needle valve which is movable to a substantially fluid flow limiting position and to a fluid flow open position whereby the flow of the diluted polymer through the conduit means and across the flow control means is selectively regulated, passing the diluted polymer solution at one fluid pressure through said flow control means to effect a lowering of the fluid pressure of the polymer solution while at the same time preventing any shear degradation of the polymer comprising the solution, and conveying the polymer solution through said conduit means to an input well site where it is injected into an oil-bearing formation.

2. A method according to claim 1 wherein the polymer solution is an aqueous solution of a partially hydrolyzed polyacrylamide.

3. A method according to claim 1 wherein the needle valve comprises a reciprocatable fluid flow regulator provided with self-adjusting fluid pressure responsive means for maintaining the fluid pressure across said regulator at a substantially constant level while at the same time preventing shear degradation of the polymer comprising the polymer solution as it passes through said valve.

4. A method according to claim 1 wherein the needle valve has an orifice size ranging from about 0.05 inch to about 2 inches.

5. A method according to claim 2 wherein the concentration of the partially hydrolyzed polyacrylamide in the solution is from about 50 to about 5000 parts per million.

* * * * *